US012710885B2

(12) United States Patent
Wang et al.

(10) Patent No.: US 12,710,885 B2
(45) Date of Patent: Aug. 18, 2026

(54) DATA RELOCATION BASED ON TRACKING HARD ERRORS IN NON-VOLATILE MEMORY DEVICES

(71) Applicant: SK hynix Inc., Icheon-si (KR)

(72) Inventors: Haobo Wang, San Jose, CA (US); Fan Zhang, Fremont, CA (US)

(73) Assignee: SK HYNIX INC., Icheon-si (KR)

( * ) Notice: Subject to any disclaimer, the term of this patent is extended or adjusted under 35 U.S.C. 154(b) by 39 days.

(21) Appl. No.: 18/827,461

(22) Filed: Sep. 6, 2024

(65) Prior Publication Data

US 2026/0072595 A1 Mar. 12, 2026

(51) Int. Cl.
*G06F 11/00* (2006.01)
*G06F 3/06* (2006.01)
*G06F 11/07* (2006.01)

(52) U.S. Cl.
CPC .......... *G06F 3/0619* (2013.01); *G06F 3/0653* (2013.01); *G06F 3/0659* (2013.01); *G06F 3/0679* (2013.01); *G06F 11/073* (2013.01); *G06F 11/076* (2013.01); *G06F 11/0793* (2013.01); *G06F 2201/88* (2013.01)

(58) Field of Classification Search
CPC .. G06F 11/073; G06F 11/076; G06F 11/3037; G06F 3/0619
See application file for complete search history.

(56) References Cited

U.S. PATENT DOCUMENTS

2002/0097613 A1* 7/2002 Raynham ............... G11C 29/72 714/E11.034
2008/0082736 A1 4/2008 Chow et al.
2015/0177995 A1* 6/2015 Camp ................ G06F 11/1048 711/103
2016/0092304 A1* 3/2016 Tabrizi ............... G06F 11/1072 714/704
2016/0266817 A1* 9/2016 Kamimura .............. G06F 3/064
2016/0335144 A1* 11/2016 Cai ..................... G06F 11/0754
2017/0132125 A1* 5/2017 Cai ..................... G06F 12/0261
2020/0210272 A1* 7/2020 Zhang ................ G06F 12/0246
2022/0254434 A1* 8/2022 Yeung .................... G11C 29/88
2022/0382625 A1 12/2022 Mekhanik et al.
2024/0241784 A1* 7/2024 Zhang ................ G06F 11/1076

* cited by examiner

*Primary Examiner* — Philip Guyton
(74) *Attorney, Agent, or Firm* — Ashurst Perkins Coie US LLP

(57) ABSTRACT

Devices, systems, and methods for improving performance of an iterative decoder in a non-volatile memory are described. An example method includes obtaining a hard error percentage, a spare byte percentage, and a total error count associated with a first page in the memory device, determining that the total error count is greater than a threshold value that is determined based on the hard error percentage and the spare byte percentage, and performing, based on the determining, a data relocation operation that relocates at least some data from the first page to a second page different from the first page.

20 Claims, 10 Drawing Sheets

110
102
Memory Area
Memory Unit (e.g., block, page)
Memory Unit
Memory Unit
104
Memory Area
Memory Unit (e.g., block, page)
Memory Unit
Memory Unit
106
Memory Area
Memory Unit (e.g., block, page)
Memory Unit
Memory Unit
108
Memory Area
Memory Unit (e.g., block, page)
Memory Unit
Memory Unit
120
121
Memory Interface (e.g., NAND memory interface)
122
System Memory
123
Buffer/Cache
124
Processor
125
ECC Engine
126
Host Interface (e.g., SATA, PATA, SD, USB, PCLe)

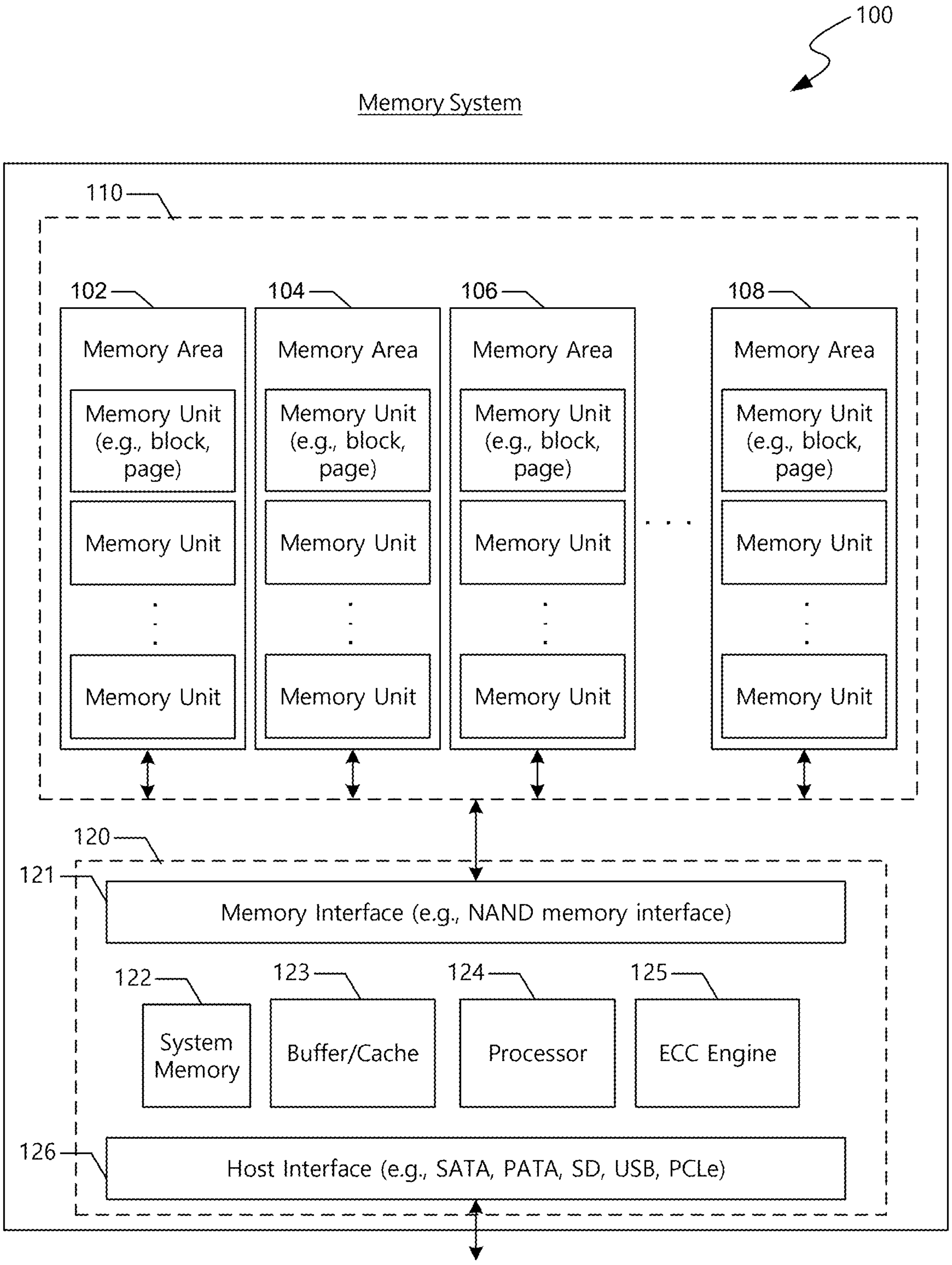

*FIG. 1*

DATA RELOCATION BASED ON TRACKING HARD ERRORS IN NON-VOLATILE MEMORY DEVICES

TECHNICAL FIELD

This patent document generally relates to non-volatile memory devices, and more specifically, to low-density parity-check codes used in non-volatile memory devices.

BACKGROUND

Data integrity is a critical feature for any data storage device and data transmission, and is typically enhanced through memory management. A requirement of memory management is to provide ways to dynamically allocate portions of memory to programs at their request, and free it for reuse when no longer needed. Several methods have been devised that increase the effectiveness of memory management, and the quality of the virtual memory manager can have an extensive effect on overall system performance. Memory management within an address space is generally categorized as either manual memory management or automatic memory management.

SUMMARY

Embodiments of the disclosed technology relate to methods, systems, and devices that improve performance of a block of a memory device that uses a low-density parity check (LDPC) code. In an example, the performance of the memory device is improved by performing data relocation based on tracking hard errors. The improved decoder can either periodically or dynamically trigger a data reclaim policy that reduces the overall hard error percentage of the memory device, thereby enabling the robust retrieval of information from various types of memory devices over the entire lifespan.

In one example, a method for improving performance of a memory device is described. The method includes obtaining a hard error percentage, a spare byte percentage, and a total error count associated with a first page in the memory device, determining that the total error count is greater than a threshold value that is determined based on the hard error percentage and the spare byte percentage, and performing, based on the determining, a data relocation operation that relocates at least some data from the first page to a second page different from the first page. In this example, a hard error in a memory cell of the first page corresponds to a voltage of the memory cell exceeding a range of voltages associated with a soft read of the memory cell, a spare byte corresponds to an unused byte in the first page, and the total error count is a total number of bit errors in the first page.

In another example, the methods may be embodied in the form of an apparatus that includes a processor and a memory coupled to the processor.

In yet another example, the methods may be embodied in the form of processor-executable instructions and stored on a computer-readable program medium.

The subject matter described in this patent document can be implemented in specific ways that provide one or more of the following features.

BRIEF DESCRIPTION OF THE DRAWINGS

FIG. 1 illustrates an example of a memory system.

DETAILED DESCRIPTION

Figure 2:
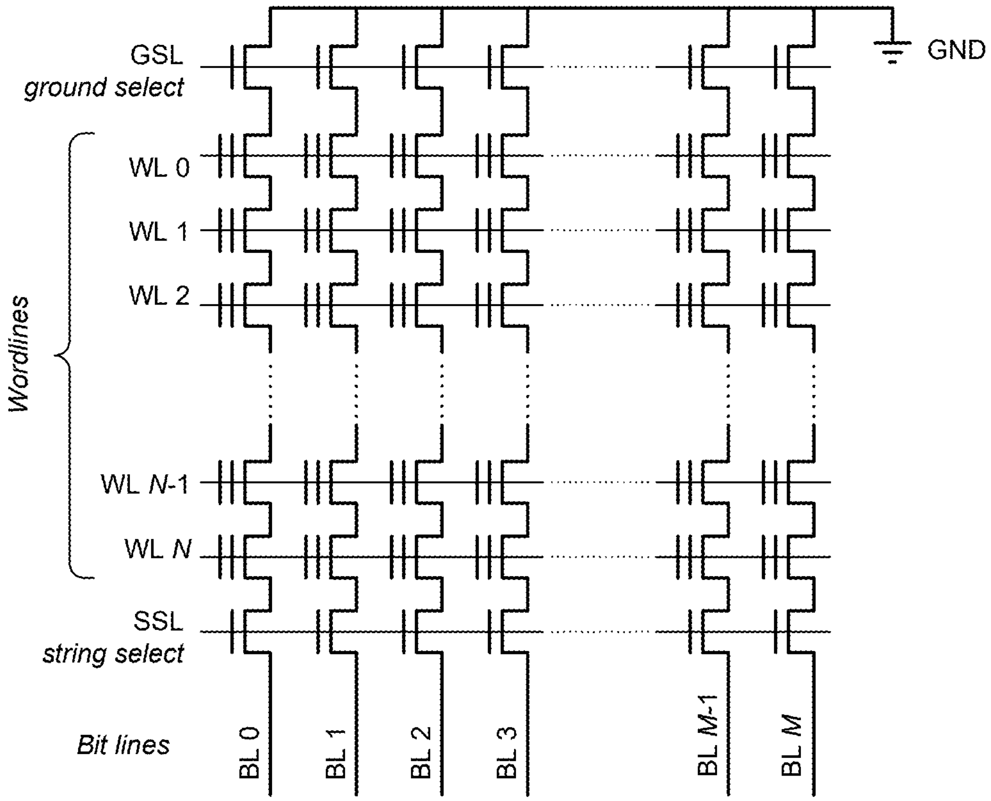
FIG. 2 is an illustration of an example non-volatile memory device.

Semiconductor memory devices may be volatile or nonvolatile. The volatile semiconductor memory devices perform read and write operations at high speeds, while contents stored therein may be lost at power-off. The nonvolatile semiconductor memory devices may retain contents stored therein even at power-off. The nonvolatile semiconductor memory devices may be used to store contents, which must be retained regardless of whether they are powered.

With an increase in a need for a large-capacity memory device, a multi-level cell (MLC) or multi-bit memory device storing multi-bit data per cell is becoming more common. However, memory cells in an MLC non-volatile memory device must have threshold voltages corresponding to four or more discriminable data states in a limited voltage window. For improvement of data integrity in non-volatile memory devices, the levels, and distributions of read voltages for discriminating the data states must be adjusted over the lifetime of the memory device to have optimal values during read operations and/or read attempts.

FIGS. 1-6 overview a non-volatile memory system (e.g., a flash-based memory, NAND flash) in which embodiments of the disclosed technology may be implemented.

FIG. 1 is a block diagram of an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, and 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a block or a page that can be identified by a unique address such as a block address or a page address, respectively. For another example, wherein the memory areas 102, 104, 106, and 108 can include computer memories that include memory banks as a logical unit of data storage, the memory unit can be a bank that can be identified by a bank address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change random-access memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 102, 104, 106, and 108 can be configured to store at least one bit of information (e.g., one bit of information or multiple bits of information), and each of the memory cells in memory area 102, 104, 106, and 108 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to execute firmware-level code, and caches and memories 123 and 122, respectively to temporarily or persistently store executable firmware/instructions and associated information. In some implementations, the controller unit 120 can include an error correction engine 125 to perform error correction operation on information stored in the memory module 110. Error correction engine 125 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

FIG. 2 illustrates an example of a memory cell array implemented based on some embodiments of the disclosed technology.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Figure 3:
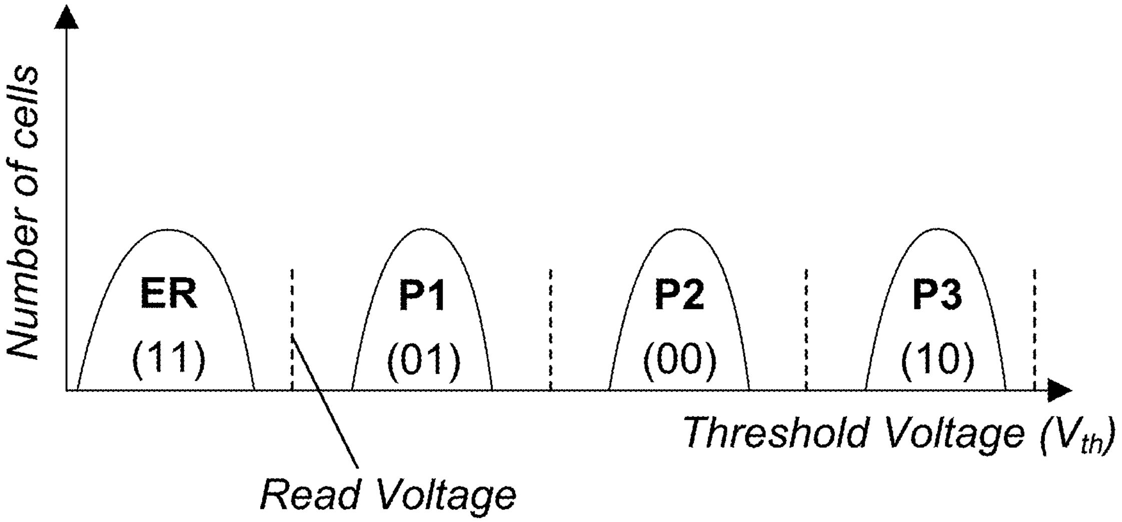
FIG. 3 is an example diagram illustrating the cell voltage level distribution (Vth) of a non-volatile memory device.

FIG. 3 illustrates an example of threshold voltage distribution curves in a multi-level cell device, wherein the number of cells for each program/erase state is plotted as a function of the threshold voltage. As illustrated therein, the threshold voltage distribution curves include the erase state (denoted "ER" and corresponding to "11") with the lowest threshold voltage, and three program states (denoted "P1", "P2" and "P3" corresponding to "01", "00" and "10", respectively) with read voltages in between the states (denoted by the dotted lines). In some embodiments, each of the threshold voltage distributions of program/erase states has a finite width because of differences in material properties across the memory array.

Although FIG. 3 shows a multi-level cell device by way of example, each of the memory cells can be configured to store any number of bits per cell. In some implementations, each of the memory cells can be configured as a single-level cell (SLC) to store one bit of information per cell, or as a triple-level cell (TLC) to store three bits of information per cell, or as a quad-level cells (QLC) to store four bits of information per cell.

In writing more than one data bit in a memory cell, fine placement of the threshold voltage levels of memory cells is needed because of the reduced distance between adjacent distributions. This is achieved by using incremental step pulse program (ISPP), i.e., memory cells on the same word-line are repeatedly programmed using a program-and-verify approach with a staircase program voltage applied to word-lines. Each programmed state associates with a verify voltage that is used in verify operations and sets the target position of each threshold voltage distribution window.

Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors, which will be discussed in the following, and such read errors may be managed in most situations by using error correction codes (ECCs).

Figure 4:
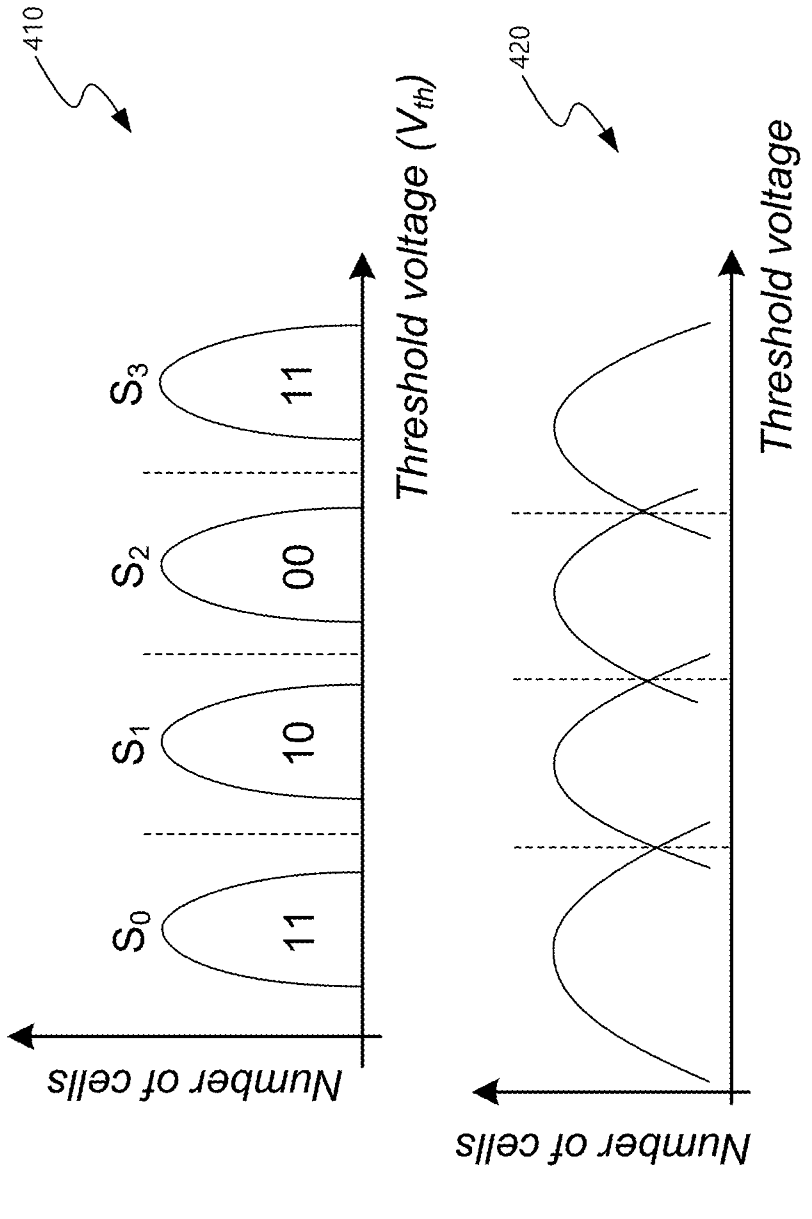
FIG. 4 is another example diagram illustrating the cell voltage level distribution (Vth) of a non-volatile memory device.

FIG. 4 illustrates an example of ideal threshold voltage distribution curves 410 and an example of distorted threshold voltage distribution curves 420. The vertical axis indicates the number of memory cells that has a particular threshold voltage represented on the horizontal axis.

For n-bit multi-level cell NAND flash memory, the threshold voltage of each cell can be programmed to $2^n$ possible values. In an ideal multi-level cell NAND flash memory, each value corresponds to a non-overlapping threshold voltage window.

Flash memory P/E cycling causes damage to a tunnel oxide of floating gate of a charge trapping layer of cell transistors, which results in threshold voltage shift and thus gradually degrades memory device noise margin. As P/E cycles increase, the margin between neighboring distributions of different programmed states decreases and eventually the distributions start overlapping. The data bit stored in a memory cell with a threshold voltage programmed in the overlapping range of the neighboring distributions may be misjudged as a value other than the original targeted value.

Figure 5:
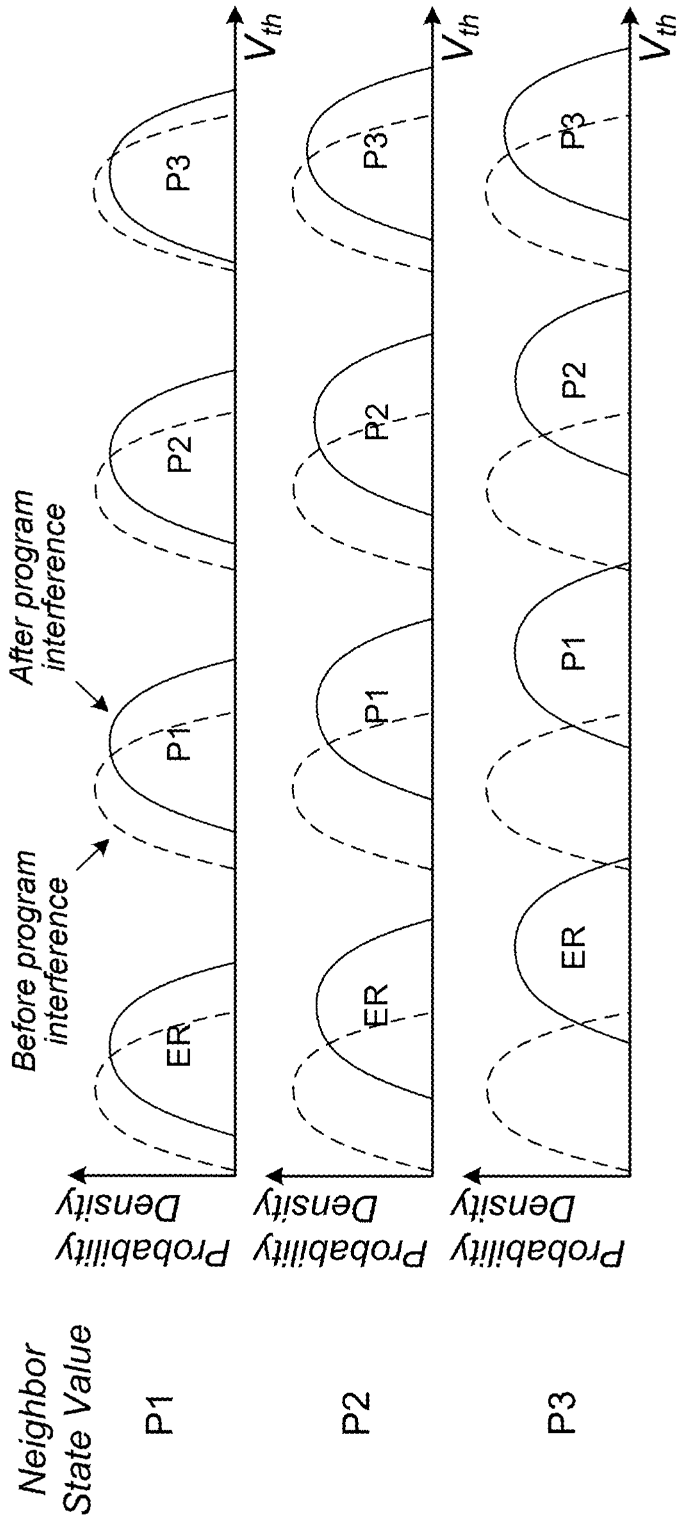
FIG. 5 is an example diagram illustrating the cell voltage level distribution (Vth) of a non-volatile memory device before and after program interference.

FIG. 5 illustrates an example of a cell-to-cell interference in NAND flash memory. The cell-to-cell interference can also cause threshold voltages of flash cells to be distorted. The threshold voltage shift of one memory cell transistor can influence the threshold voltage of its adjacent memory cell transistor through parasitic capacitance-coupling effect between the interfering cell and the victim cell. The amount of the cell-to-cell interference may be affected by NAND flash memory bit-line structure. In the even/odd bit-line structure, memory cells on one word-line are alternatively connected to even and odd bit-lines and even cells are programmed ahead of odd cells in the same word-line. Therefore, even cells and odd cells experience different amount of cell-to-cell interference. Cells in all-bit-line structure suffer less cell-to-cell interference than even cells in the even/odd bit-line structure, and the all-bit-line structure can effectively support high-speed current sensing to improve the memory read and verify speed.

The dotted lines in FIG. 5 denote the nominal distributions of P/E states (before program interference) of the cells under consideration, and the "neighbor state value" denotes the value that the neighboring state has been programmed to. As illustrated in FIG. 5, if the neighboring state is programmed to P1, the threshold voltage distributions of the cells under consideration shift by a specific amount. However, if the neighboring state is programmed to P2, which has a higher threshold voltage than P1, that results in a greater shift compared to the neighboring state being P1. Similarly, the shift in the threshold voltage distributions is greatest when the neighboring state is programmed to P3.

Figure 6:
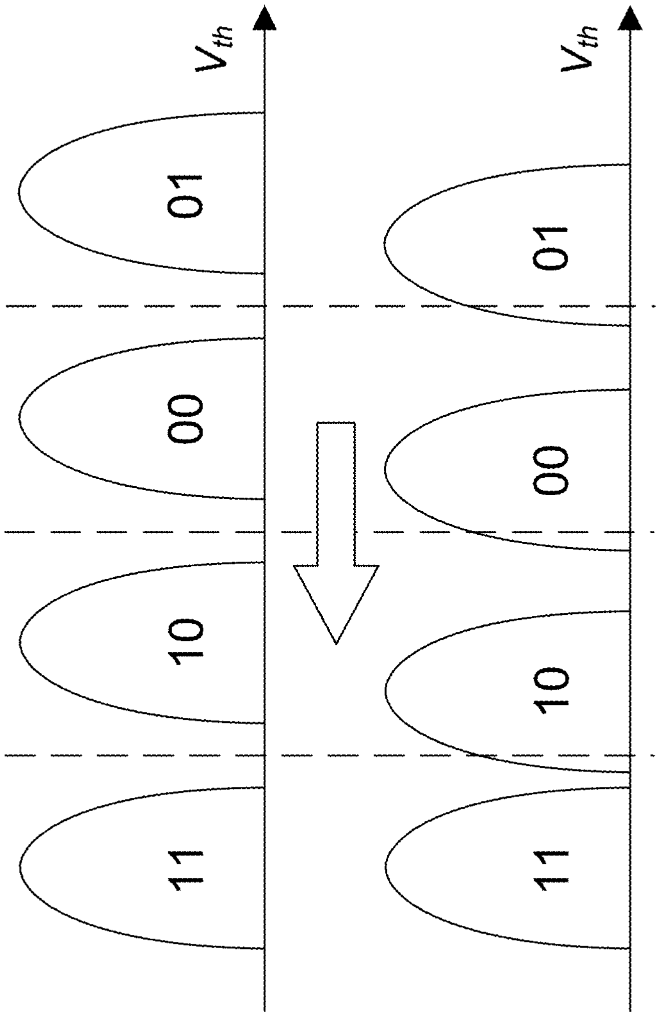
FIG. 6 is an example diagram illustrating the cell voltage level distribution (Vth) of a non-volatile memory device as a function of the reference voltage.

FIG. 6 illustrates an example of a retention error in NAND flash memory by comparing normal threshold-voltage distribution and shifted threshold-voltage distribution. The data stored in NAND flash memories tend to get corrupted over time and this is known as a data retention error. Retention errors are caused by loss of charge stored in the floating gate or charge trap layer of the cell transistor. Due to wear of the floating gate or charge trap layer, memory cells with more program erase cycles are more likely to experience retention errors. In the example of FIG. 6, comparing the top row of voltage distributions (before corruption) and the bottom row of distributions (contaminated by retention error) reveals a shift to the left.

LDPC codes are often used to as forward error correction codes in non-volatile memory devices (e.g., as described in FIGS. 1-6) due to their excellent correction performance and low complexity. LDPC decoders can be configured to operate using low-complexity iterative message-passing decoding methods like bit-flipping, min-sum or sum-product algorithms.

The performance of an LDPC decoder not only depends on the failed bit count (FBC), which is associated with the choice of hard read thresholds, but also depends on the percentage of hard errors. For a typical soft LDPC decoder, at a certain FBC, the higher the hard error percentage is, the higher the codeword failure rate (CFR) is. For a penta-level cell (PLC) NAND memory device, all read commands use soft decoding. A PLC NAND memory device stores 5 bits per cell, and consequently, the percentage of hard errors is expected to be higher than that in a triple-layer cell (TLC) and/or a quad-level cell (QLC). Embodiments of the disclosed technology provide methods, systems, and devices that relocate the data by utilizing both the traditional FBC, as well as the hard error percentage made available by a hard error tracker. In some embodiments, the hard error track is described in U.S. Pat. No. 12,038,805, the disclosure of which is hereby incorporated by reference herein in its entirety.

In NAND memory devices, for each received bit, e.g., each bit read from a NAND page, the log likelihood ratio (LLR) is a real number that represents the likelihood of that received bit being zero-valued or being one-valued. By convention, a positive LLR is indicative of the bit being zero, whereas a negative LLR is indicative of the bit being one. The LLR values can be generated based on the probabilities of bit patterns in different bins.

Figure 7:
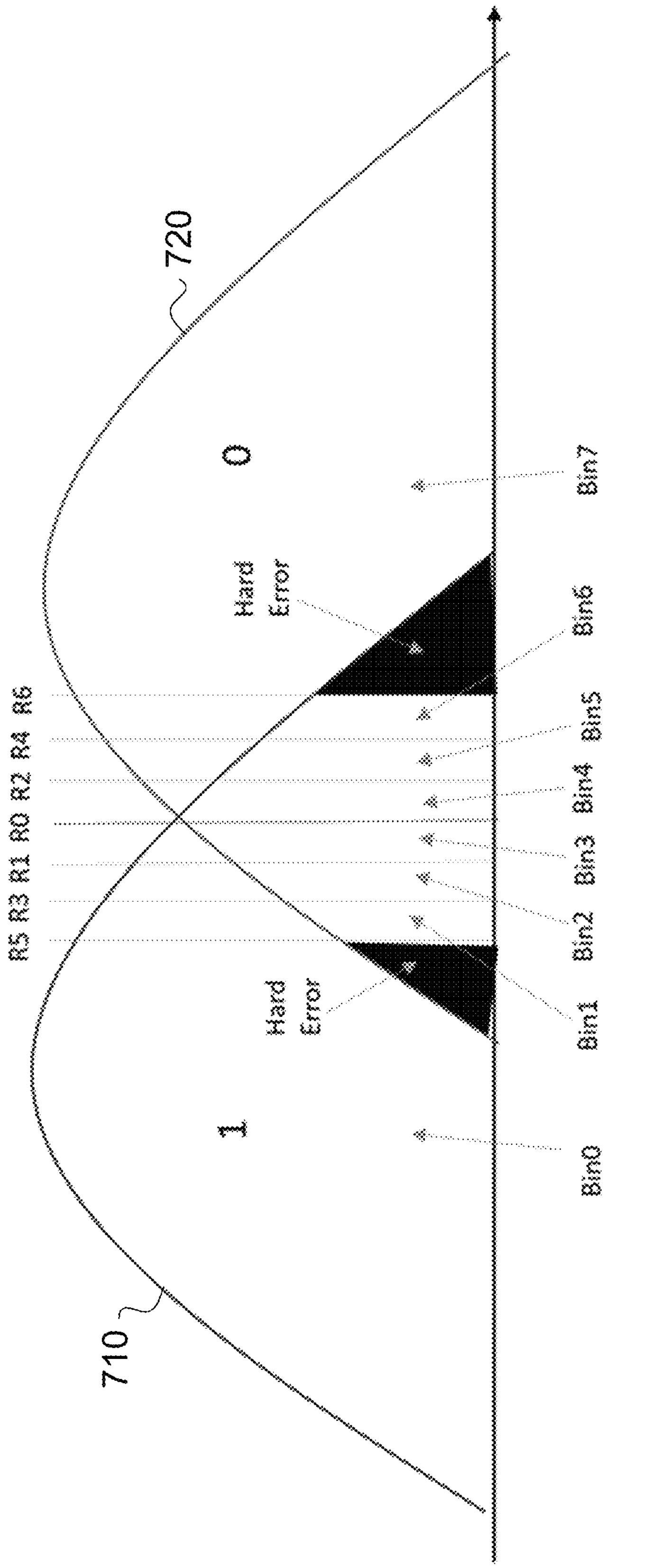
FIG. 7 is an example diagram illustrating reads between voltage levels.

In some embodiments, and as shown in FIG. 7 that illustrates an example diagram for reads between voltage levels, there are seven reads, which include one hard read (denoted R0) and six soft reads (denoted R1, . . . , R6) between adjacent voltage levels. The curves 710 and 720 in FIG. 7 represent the probability density functions (PDFs) of the actual voltage distribution of the corresponding written voltage.

As shown in FIG. 7, the left curve 710 corresponds to written value 1, the right curve 720 corresponds to written value 0, and the probability of writing a value 0 and a value 1 are assumed to be the same. There are 7 read thresholds (denoted R0, R1, R2, . . . , and R6), where R0 is the hard read at the cross point of the left curve 710 and the right curve 720, and R1, R2, . . . , R6 are the six soft reads. The 7 thresholds divide the area under curves into eight parts, namely bin0, bin1, bin2, bin3, . . . , bin7. The notation r=bin0, bin1, . . . , bin7 (or simply r=0, 1, 2, . . . , 7) is used to represent the event where the read result falls into each bin; this representation is referred to as a bin label. Furthermore, w=0 and w=1 is used to represent the originally stored information as being a 0 or 1, respectively, and corresponding to the left PDF and right PDF. In an example, the LLR values of each bin are given as below:

$$LLR(\text{bin0}) = \log\frac{Pr(r=0 \mid w=0)}{Pr(r=0 \mid w=1)}$$

-continued $$LLR(\text{bin1}) = \log\frac{Pr(r = 1 \mid w = 0)}{Pr(r = 1 \mid w = 1)}$$

$$\vdots$$

$$LLR(\text{bin7}) = \log\frac{Pr(r = 7 \mid w = 0)}{Pr(r = 7 \mid w = 1)}$$

It is further assumed, for the example shown in FIG. 7, that the left curve 710 and the right curve 720 are symmetric around R0, and furthermore, R1/R2, R3/R4 and R5/R6 are symmetric around R0. Additionally, the LLR values for bin0 through bin7 are also symmetric, but with opposite signs. For example, LLR (bin0)=−7, LLR (bin1)=−4, LLR (bin2)=−2, LLR (bin3)=−1, LLR (bin4)=1, LLR (bin5)=2, LLR (bin6)=4, and LLR (bin7)=7. In other embodiments, a non-symmetric arrangement of LLR values can be used for bin0 through bin7, e.g., based on the value of an asymmetric ratio that is computed using the ones count and zeros count in the codeword after a predetermined number of LDPC decoder iterations. In these examples, using the non-symmetric arrangement of LLR values adds negligible hardware and software complexity to the overall system.

In some embodiments, a hard error is defined as the event when, during a soft read, a cell's voltage falls out of the soft range, which is defined in Table 1.

TABLE 1

Example definitions of the soft range

| Block type | Soft range (around optimal read threshold) |
|---|---|
| SLC | ±400 mV |
| MLC | ±400 mV |
| TLC | ±250 mV |

Referring back to FIG. 7, the area corresponding to a hard error is the union of the two regions labeled "Hard Error". If the voltage is within this region, the LLR may be assigned a maximum magnitude (e.g., 7 for a 3-bit LLR) with the wrong sign.

Figure 8:
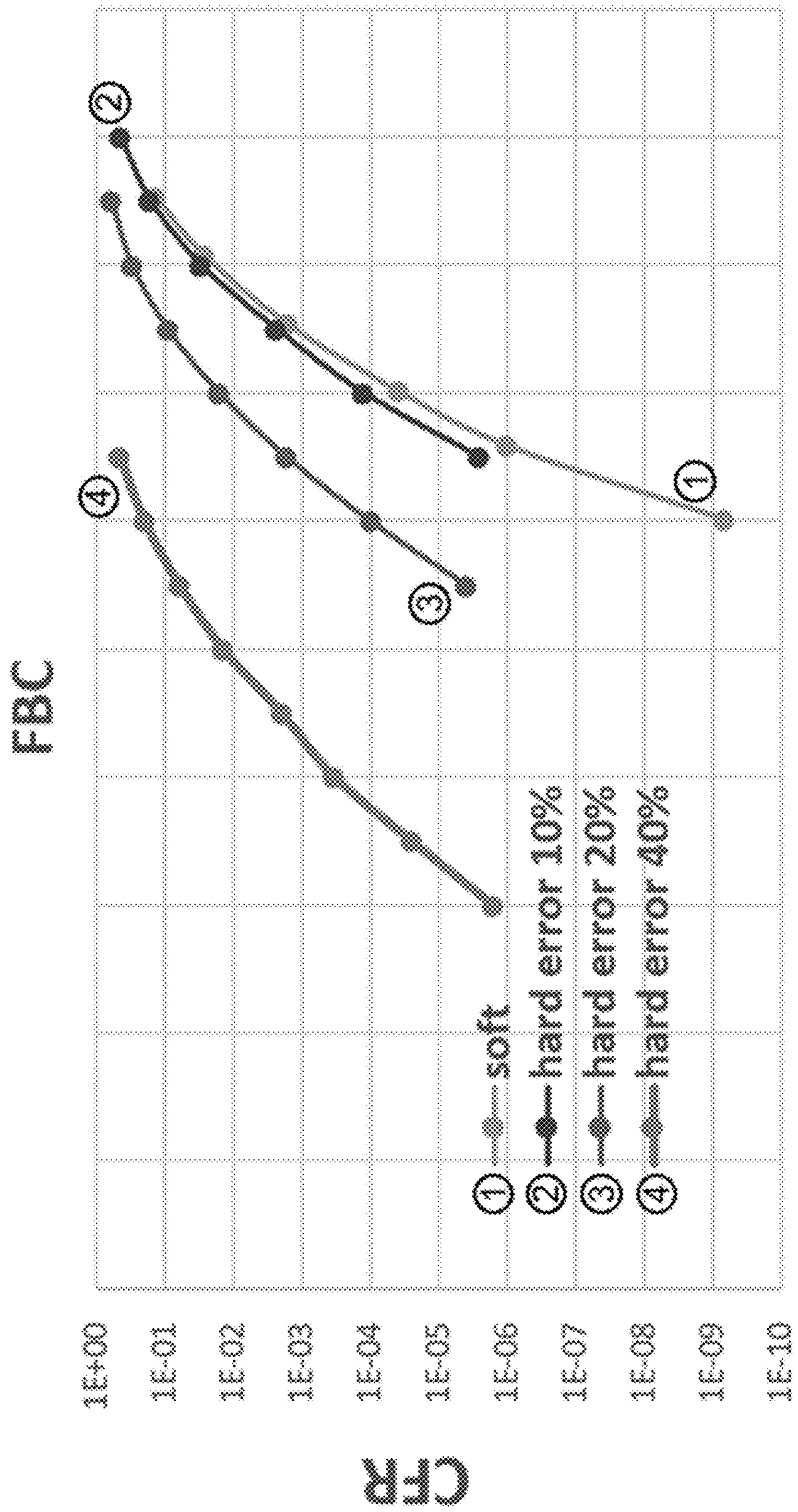
FIG. 8 is a plot of example simulation results illustrating degradation of soft decoding correction capabilities as the percentage of hard errors increase.

In existing non-volatile memory devices that use error correction, e.g., LDPC codes, a decoder's soft read error correction capability significantly degrades when a high percentage of hard errors exist. FIG. 8 illustrates a decoder's soft read error correction capability for different percentages of hard errors. As shown therein, when the FBC is the same, a higher percentage of hard errors results in a higher codeword failure rate (CFR). Said another way, for a certain CFR target (e.g., $10^{-5}$), the achievable FBC increases as the percentage of hard errors decreases.

Figure 9:
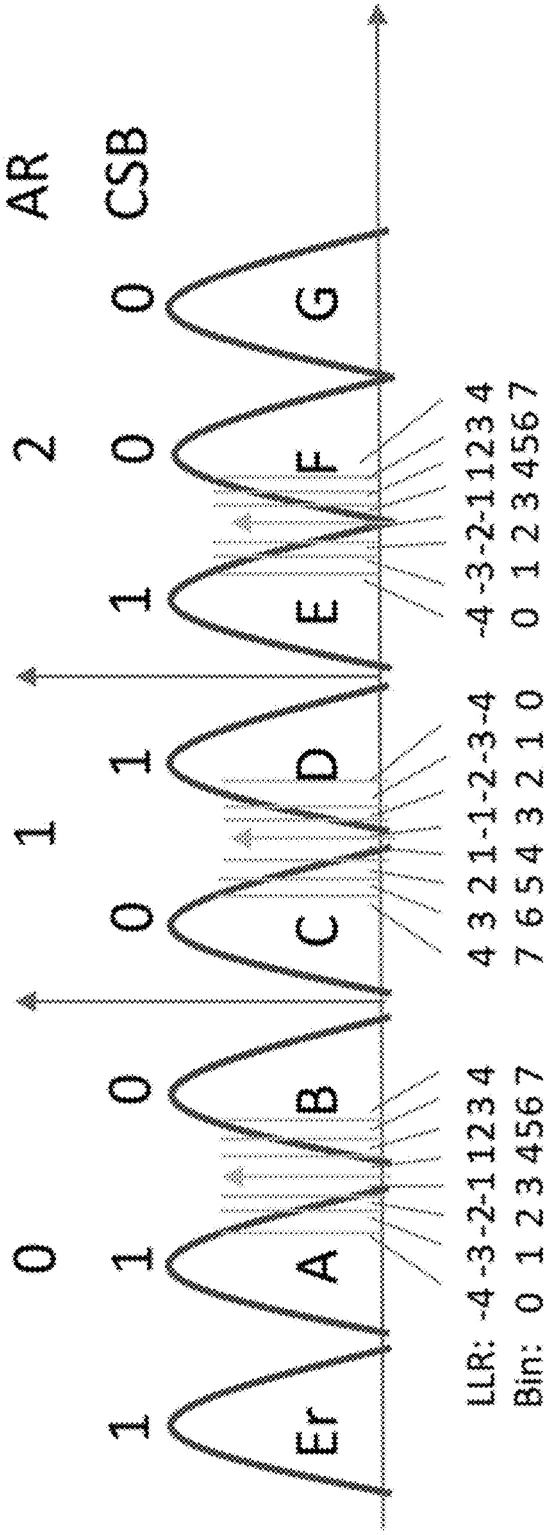
FIG. 9 is an example diagram of central significant bit (CSB) mapping in a triple-level cell (TLC) NAND memory device.

In some embodiments, the bit mapping, bin placements, and assist read (AR) placements for a TLC NAND central significant bit (CSB) page type are configured as illustrated in FIG. 9. As shown therein, the CSB page is read using 7 reads, corresponding to each group of vertical lines. Furthermore, two additional assist reads are performed to enable an accurate identification of the bin the read result falls into. Two assist reads result in three AR zones, denoted "0", "1" and "2", which each zone including a group of 8 bins resulting from 7 reads, as shown in FIG. 7. In this example, it is further assumed that bin labels 0, 1, . . . , 7 represent the 8 bins from CSB bit 1 to CSB bit 0 (e.g., as shown in AR zone 1 in FIG. 9).

In some embodiments, a hard error tracker model uses the bin label, assist read (AR), and decoding result from the decoder, when the decoding is successful, to generate counters that count the number of bits that fall into each bin and are decoded to be 0 or 1. The notation C(B→Y, AR) is used to represent the counter for bin label B, decoded bit Y (equaling either 0 or 1), and assist read zone AR.

In an example, if 7 bits were read, the [bin label, AR] pair array is assumed to be:

[(0, 0), (6, 1), (7, 1), (2, 1), (5, 1), (2, 2), (3, 0)]

It is further assumed that the LLRs of the 7 bits are [−4, 3, 4, −2, 2, −2, −1], and when these are fed into the decoder, the decoding output is [1, 0, 0, 0, 0, 1, 1]. In this example, the output of the hard error tracker for a bin being decoded to a "0" in AR 0 is:

| | | |
|---|---|---|
| C(0→0, 0) = 0 | C(1→0, 0) = 0 | C(2→0, 0) = 0 |
| C(3→0, 0) = 0 | C(4→0, 0) = 0 | C(5→0, 0) = 0 |
| C(7→0, 0) = 0 | C(7→0, 0) = 0; and | |

The output for a bin being decoded to a "1" in AR 0 is:

| | | |
|---|---|---|
| C(0→1, 0) = 1 | C(1→1, 0) = 0 | C(2→1, 0) = 0 |
| C(3→1, 0) = 1 | C(4→1, 0) = 0 | C(5→1, 0) = 0 |
| C(7→1, 0) = 0 | C(7→1, 0) = 0; and | |

The output for a bin being decoded to a "0" in AR 1 is:

| | | |
|---|---|---|
| C(0→0, 1) = 0 | C(1→0, 1) = 0 | C(2→0, 1) = 1 |
| C(3→0, 1) = 0 | C(4→0, 1) = 0 | C(5→0, 1) = 1 |
| C(7→0, 1) = 1 | C(7→0, 1) = 1; and | |

The output for a bin being decoded to a "1" in AR 1 is:

| | | |
|---|---|---|
| C(0→1, 1) = 0 | C(1→1, 1) = 0 | C(2→1, 1) = 0 |
| C(3→1, 1) = 0 | C(4→1, 1) = 0 | C(5→1, 1) = 0 |
| C(7→1, 1) = 0 | C(7→1, 1) = 0; and | |

The output for a bin being decoded to a "0" in AR 2 is:

| | | |
|---|---|---|
| C(0→0, 2) = 0 | C(1→0, 2) = 0 | C(2→0, 2) = 0 |
| C(3→0, 2) = 0 | C(4→0, 2) = 0 | C(5→0, 2) = 0 |
| C(7→0, 2) = 0 | C(7→0, 2) = 0; and | |

The output for a bin being decoded to a "1" in AR 2 is:

| | | |
|---|---|---|
| C(0→1, 2) = 0 | C(1→1, 2) = 0 | C(2→1, 2) = 1 |
| C(3→1, 2) = 0 | C(4→1, 2) = 0 | C(5→1, 2) = 0 |
| C(7→1, 2) = 0 | C(7→1, 2) = 0. | |

In some embodiments, and more generally, an example algorithm to generate the hard error signals is described below:

```
Hard_err_cnt = 0 //total hard error count
Hard_err_cnt_per_ar_0to1 = [0, ...0] //hard error count per AR pattern
Hard_err_cnt_per_ar_1to0 = [0, ...0] //hard error count per AR pattern
Hard_err_cnt_per_ar = [0, ...0] //hard error count per AR pattern
Total_err_cnt = 0
Total_err_cnt_per_ar_0to1 = [0, ...0]
Total_err_cnt_per_ar_1to1 = [0, ...0]
Total_err_cnt_per_ar = [0, ...0]
Hard_err_percent=0
Hard_err_percent_per_ar_0to1=[0, ...0]
```

-continued

```
Hard_err_percent_per_ar_1to0=[0, ...0]
Hard_err_percent_per_ar=[0, ...0]
For ar in AR:
   Hard_err_cnt_per_ar_0to1[ar] = C(7→1, ar)
   Hard_err_cnt_per_ar_1to0[ar] = C(0→0, ar)
   Hard_err_cnt_per_ar[ar] = Hard_err_cnt_per_ar_0to1[ar] +
Hard_err_cnt_per_ar_1to0[ar]
   Hard_err_cnt = Hard_err_cnt + Hard_err_cnt_per_ar[ar]
   For hd in [0,1]
      For bin_label in [0,1,2,3]
         Total_err_cnt_per_ar_1to0[ar] = C(bin_label→0, ar)
      For bin_label in [4,5,6,7]
         Total_err_cnt_per_ar_0to1[ar] = C(bin_label→1, ar)
      Total_err_cnt_per_ar[ar] = Total_err_cnt_per_ar_1to0[ar] +
Total_err_cnt_per_ar_0to1[ar]
   Total_err_cnt = Total_err_cnt + Total_err_cnt_per_ar[ar]
For ar in AR:
   Hard_err_percent_per_ar[ar] =
hard_err_cnt_per_ar[ar]/total_err_cnt_per_ar[ar]
   Hard_err_percent_per_ar_0to1[ar] = hard_err_cnt_per_ar_0to1
[ar]/total_err_cnt_per_ar_0to1 [ar]
   Hard_err_percent_per_ar_1to0 [ar] = hard_err_cnt_per_ar_1to0
[ar]/total_err_cnt_per_ar_1to0 [ar]
Hard_err_percent = hard_err_cnt/total_err_cnt
```

As previously discussed, and evidenced in FIG. 8, hard errors have a significant impact on a soft decoder's error correction capability. In fact, when the hard error percentage is too high, even if the failed bit count (FBC) is low, it is advantageous to relocate the data in the hard error impacted block using, for example, the described embodiments (e.g., which rely on the hard error tracker metric "Hard_err_percent" in the algorithm described above) or existing memory relocation techniques, e.g., garbage collection.

Embodiments of the disclosed technology advantageously use both the FBC and hard error percentage to predict soft decoding failures. In other embodiments, the size of the spare blocks (e.g., an absolute value or a percentage of the total number of blocks) is also incorporated to determine an estimate of soft decoding failures because it has been empirically determined that the error correction capability of a soft decoder varies based on the number (or percentage) of spare blocks (also referred to as spare bytes).

In an example, for a certain page in a block, if the hard error percentage is 40%, the spare byte percentage is under 8%, and the total error count is higher than 300, an example policy in accordance with the disclosed embodiments will decide to reclaim the block. In another example, the reclaim policy is represented by Table 2, in which the hard error percentage (HEP) and FBC correspond to the "Hard_err_percent" and "total_err_cnt" metrics in the above example algorithm, respectively.

TABLE 2

Example of a whole block data reclaim policy

| | Spare ≤ 8% | 8% < Spare ≤ 12% | Spare > 12% |
|---|---|---|---|
| HEP ≤ 10% | FBC > 500 | FBC > 600 | FBC > 700 |
| 10% < HEP ≤ 30% | FBC > 400 | FBC > 500 | FBC > 500 |
| HEP > 30% | FBC > 300 | FBC > 400 | FBC > 300 |

In some embodiments, a first mode for a reclaim policy based on Table 2 is a passive mode, wherein, if during the normal operation of the drive, one of the conditions in Table 2 is satisfied by a host read of a page, the corresponding block is reclaimed. This approach is relatively simple to implement. However, but for the current read that triggered the data reclaim policy, it will not improve the latency of the current read because the high hard error percentage may cause existing defense flows to use more steps to recover the data.

A second mode for the reclaim policy is an active mode. Therein, during the normal operation of the drive, background scan reads are periodically conducted on each block to sample certain pages, and collect the hard error percentage and the FBC statistics. If a sampled page in a block satisfies any of the trigger conditions in Table 2, the drive proactively relocates the data in the block, so that when an actual read is requested to this block of data, the drive can respond correctly and with lower latency. This mode may be implemented with higher complexity than the first mode, but can advantageously reduce the overall hard error percentage of the drive.

Figure 10:
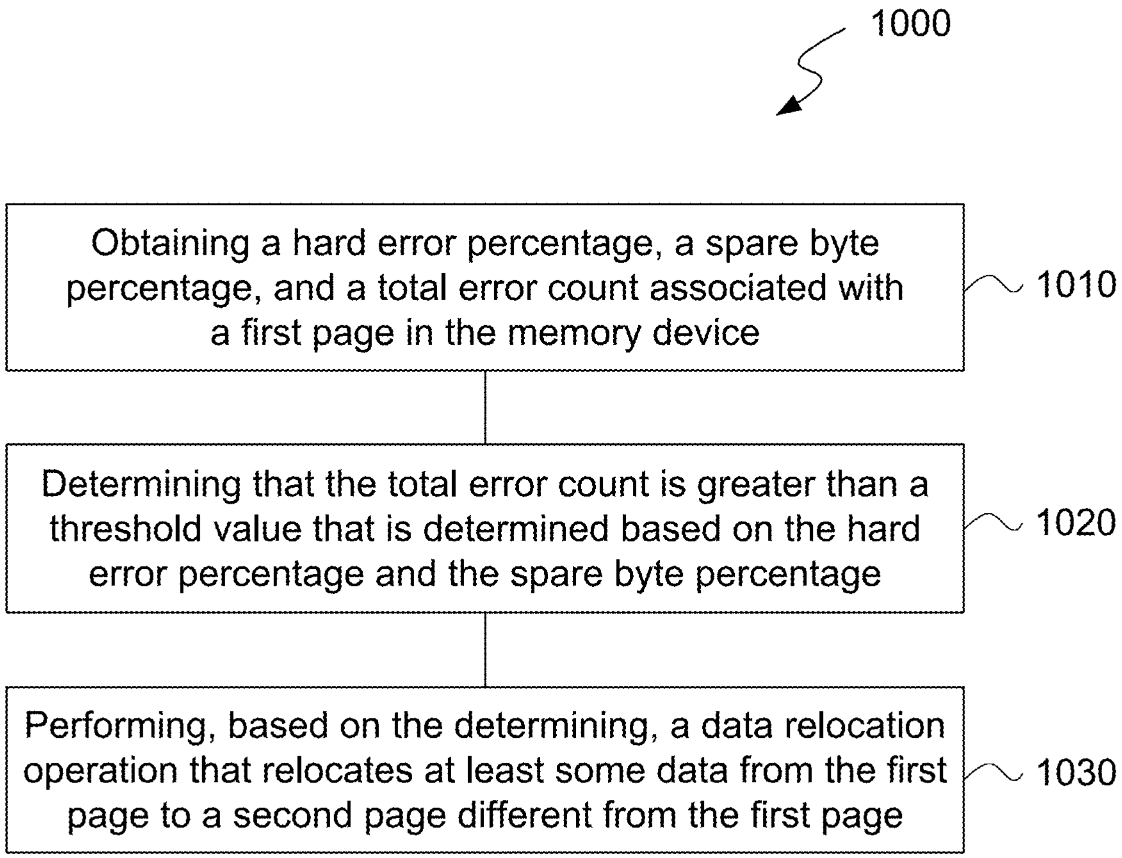
FIG. 10 illustrates a flowchart of an example method for improving the performance of a memory device.

FIG. 10 illustrates a flowchart of an example method 1000 for improving the performance of a memory device. The method 1000 includes, at operation 1010, obtaining a hard error percentage, a spare byte percentage, and a total error count associated with a first page in the memory device. In some embodiments, a hard error in a memory cell of the first page corresponds to a voltage of the memory cell exceeding a range of voltages associated with a soft read of the memory cell, a spare byte corresponds to an unused byte in the first page, and the total error count is a total number of bit errors in the first page.

The method 1000 includes, at operation 1020, determining that the total error count is greater than a threshold value that is determined based on the hard error percentage and the spare byte percentage.

The method 1000 includes, at operation 1030, performing, based on the determining, a data relocation operation that relocates at least some data from the first page to a second page different from the first page.

In some embodiments, the at least some data from the first page comprises all data that can be retrieved from the first page during the data relocation operation.

In some embodiments, the data relocation operation is performed during a host read of the first page, e.g., during a passive mode implementation of the described embodiments.

In some embodiments, the data relocation operation is performed during a background scan read of the first page. In this example, the method 1000 further includes the operations of receiving, from a host, a read request for data from the first page, and routing, subsequent to the data relocation operation, the read request to retrieve the data from the second page, e.g., during an active mode implementation of the described embodiments.

In some embodiments, the memory cell is a single-level cell (SLC) or a multi-level cell (MLC), and the hard error corresponds to the voltage exceeding 400 mV from an optimal read threshold of the memory cell. In other embodiments, the memory cell is a quad-level cell (QLC), and the hard error corresponds to the voltage exceeding 250 mV from an optimal read threshold of the memory cell.

In some embodiments, the total error count corresponds to a failed bit count.

In some embodiments, the threshold value is determined, based on the hard error percentage (HEP) and the spare byte percentage (SBP), as:

| | SBP ≤ 8% | 8% < SBP ≤ 12% | SBP > 12% |
|---|---|---|---|
| HEP ≤ 10% | 500 | 600 | 700 |
| 10% < HEP ≤ 30% | 400 | 500 | 500 |
| HEP > 30% | 300 | 400 | 300 |

Figure 11:
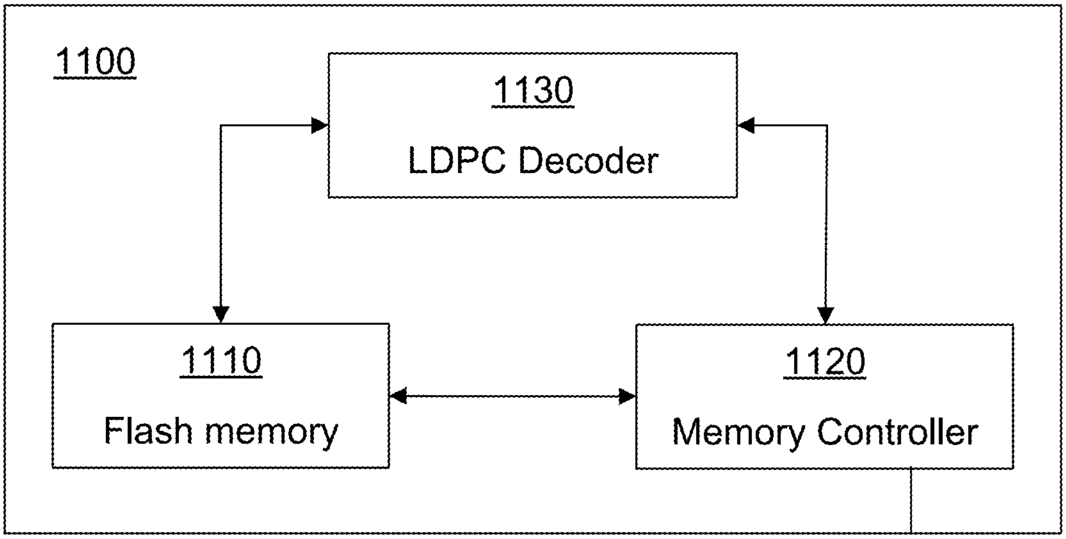
FIG. 11 is an example diagram illustrating a storage device that can be configured to implement the described embodiments.

FIG. 11 is an example diagram illustrating a storage device that can be configured to implement the described embodiments. Referring to FIG. 11, a data storage device 1100 may include a flash memory 1110, a memory controller 1120, and an LDPC decoder 1130. The memory controller 1120 may control the flash memory 1110 and the LDPC decoder 1130 in response to control signals input from the outside of the data storage device 1100. In the data storage device 1100, the flash memory 1110 may be configured the same or substantially the same as a nonvolatile memory device. That is, the flash memory 1110 may read data from selected memory cells using different read voltages to output it to the memory controller 1120.

In some embodiments, the data storage device 1100 may be a memory card device, an SSD device, a multimedia card device, an SD card, a memory stick device, an HDD device, a hybrid drive device, or an USB flash device. For example, the data storage device 1100 may be a card which satisfies the standard for user devices such as a digital camera, a personal computer, and so on.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for improving a performance of a memory device, comprising:

obtaining a hard error percentage of a first page in the memory device, a spare byte percentage of the first page, and a total error count associated with the first page, wherein a hard error in a memory cell of the first page corresponds to a voltage of the memory cell exceeding a range of voltages associated with a soft read of the memory cell, wherein a spare byte corresponds to an unused byte in the first page, and wherein the total error count is a total number of bit errors in the first page;

determining that the total error count is greater than a threshold value, wherein the threshold value is determined based on the hard error percentage and the spare byte percentage; and performing, based on the determining, a data relocation operation that relocates at least some data from the first page to a second page different from the first page.

2. The method of claim 1, wherein the at least some data from the first page comprises all data that can be retrieved from the first page during the data relocation operation.

3. The method of claim 1, wherein the data relocation operation is performed during a host read of the first page.

4. The method of claim 1, wherein the data relocation operation is performed during a background scan read of the first page.

5. The method of claim 4, comprising:

receiving, from a host, a read request for data from the first page; and routing, subsequent to the data relocation operation, the read request to retrieve the data from the second page.

6. The method of claim 1, wherein the memory cell is a single-level cell (SLC) or a multi-level cell (MLC), and the hard error corresponds to the voltage exceeding 400 mV from an optimal read threshold of the memory cell.

7. The method of claim 1, wherein the memory cell is a quad-level cell (QLC), and the hard error corresponds to the voltage exceeding 250 mV from an optimal read threshold of the memory cell.

8. The method of claim 1, wherein the total error count corresponds to a failed bit count.

9. The method of claim 1, wherein the threshold value is determined, based on the hard error percentage (HEP) and the spare byte percentage (SBP), as:

| | SBP ≤ 8% | 8% < SBP ≤ 12% | SBP > 12% |
|---|---|---|---|
| HEP ≤ 10% | 500 | 600 | 700 |
| 10% < HEP ≤ 30% | 400 | 500 | 500 |
| HEP > 30% | 300 | 400 | 300. |

10. A system for improving a performance of a memory device, comprising:

a processor and a memory including instructions stored thereupon, wherein the instructions upon execution by the processor cause the processor to:

obtain a hard error percentage of a first page in the memory device, a spare byte percentage of the first page, and a total error count associated with the first page, wherein a hard error in a memory cell of the first page corresponds to a voltage of the memory cell exceeding a range of voltages associated with a soft read of the memory cell, wherein a spare byte corresponds to an unused byte in the first page, and wherein the total error count is a total number of bit errors in the first page;

determine that the total error count is greater than a threshold value, wherein the threshold value is determined based on the hard error percentage and the spare byte percentage; and perform, based on the determining, a data relocation operation that relocates at least some data from the first page to a second page different from the first page.

11. The system of claim 10, wherein the at least some data from the first page comprises all data that can be retrieved from the first page during the data relocation operation.

12. The system of claim 10, wherein the data relocation operation is performed during a host read of the first page.

13. The system of claim 10, wherein the data relocation operation is performed during a background scan read of the first page.

14. The system of claim 13, wherein the instructions upon execution by the processor cause the processor to:

receive, from a host, a read request for data from the first page; and route, subsequent to the data relocation operation, the read request to retrieve the data from the second page.

15. The system of claim 10, wherein the total error count corresponds to a failed bit count.

16. A non-transitory computer-readable storage medium having instructions stored thereupon for improving a performance of a memory device, comprising:

instructions for obtaining a hard error percentage of a first page in the memory device, a spare byte percentage of the first page, and a total error count associated with the first page in the memory device, wherein a hard error in a memory cell of the first page corresponds to a voltage of the memory cell exceeding a range of voltages associated with a soft read of the memory cell, wherein a spare byte corresponds to an unused byte in the first page, and wherein the total error count is a total number of bit errors in the first page;

instructions for determining that the total error count is greater than a threshold value, wherein the threshold value is determined based on the hard error percentage and the spare byte percentage; and instructions for performing, based on the determining, a data relocation operation that relocates at least some data from the first page to a second page different from the first page.

17. The non-transitory computer-readable storage medium of claim 16, wherein the at least some data from the first page comprises all data that can be retrieved from the first page during the data relocation operation.

18. The non-transitory computer-readable storage medium of claim 16, wherein the data relocation operation is performed during a host read of the first page.

19. The non-transitory computer-readable storage medium of claim 16, wherein the data relocation operation is performed during a background scan read of the first page.

20. The non-transitory computer-readable storage medium of claim 19, comprising:

receiving, from a host, a read request for data from the first page; and routing, subsequent to the data relocation operation, the read request to retrieve the data from the second page.

* * * * *